United States Patent
Lamy-Bergot et al.

(10) Patent No.: US 8,493,449 B2
(45) Date of Patent: Jul. 23, 2013

(54) METHOD OF ESTIMATING VIDEO QUALITY AT ANY RESOLUTION

(75) Inventors: Catherine Lamy-Bergot, Ville (FR);
Sébastien Marcille, Colombes (FR)

(73) Assignee: Thales, Neuilly-sur-Seine (FR)

( * ) Notice: Subject to any disclaimer, the term of this patent is extended or adjusted under 35 U.S.C. 154(b) by 0 days.

(21) Appl. No.: 13/514,831

(22) PCT Filed: Dec. 10, 2010

(86) PCT No.: PCT/EP2010/069386
§ 371 (c)(1),
(2), (4) Date: Aug. 23, 2012

(87) PCT Pub. No.: WO2011/070158
PCT Pub. Date: Jun. 16, 2011

(65) Prior Publication Data
US 2013/0135482 A1    May 30, 2013

(30) Foreign Application Priority Data
Dec. 11, 2009    (FR) ...................................... 09 06006

(51) Int. Cl.
*H04N 17/00*    (2006.01)
*H04N 7/26*    (2006.01)

(52) U.S. Cl.
USPC ................. 348/192; 375/240.02; 375/240.26

(58) Field of Classification Search
USPC ..................... 348/180, 192; 375/224, 240.02, 375/240.27, 240.29, 240.26; 702/66, 69, 702/71, 75, 76, 81; 382/234, 240
See application file for complete search history.

(56) References Cited

U.S. PATENT DOCUMENTS

| | | | | |
|---|---|---|---|---|
| 5,253,058 A * | 10/1993 | Gharavi | ................... | 375/240.12 |
| 6,574,279 B1* | 6/2003 | Vetro et al. | ................ | 375/240.23 |
| 6,580,754 B1* | 6/2003 | Wan et al. | ................ | 375/240.01 |
| 6,836,512 B2* | 12/2004 | Van Der Schaar et al. | ........................ | 375/240.11 |
| 7,136,532 B2* | 11/2006 | Van Der Schaar | ............ | 382/233 |
| 8,311,115 B2* | 11/2012 | Gu et al. | ................... | 375/240.16 |
| 8,345,158 B2* | 1/2013 | Robertson et al. | ............ | 348/459 |
| 8,374,239 B2* | 2/2013 | Yin et al. | ..................... | 375/240.12 |
| 2006/0008000 A1* | 1/2006 | Ye et al. | ...................... | 375/240 |
| 2007/0189389 A1* | 8/2007 | Boisson et al. | ........... | 375/240.16 |
| 2008/0232473 A1* | 9/2008 | Marquant et al. | ........ | 375/240.16 |
| 2010/0091841 A1* | 4/2010 | Ishtiaq et al. | ............. | 375/240.02 |
| 2010/0220592 A1* | 9/2010 | Pan et al. | ....................... | 370/232 |
| 2010/0265334 A1* | 10/2010 | Bhaskaran et al. | ............ | 348/180 |

OTHER PUBLICATIONS

Z. Wang et al.: "Video quality assessment based on structural distortion measurement," Signal Processing. Image Communication, Elsevier Science Publishers, Amsterdam, NL, vol. 19, No. 2, Feb. 1, 2004, pp. 121-132.

(Continued)

*Primary Examiner* — Victor Kostak
(74) *Attorney, Agent, or Firm* — Baker Hostetler LLP

(57) ABSTRACT

Method of estimating the perceived quality of a video sequence at a maximum spatial resolution and a maximum temporal resolution, and at a lower spatial resolution and/or temporal resolution, said method including filtering said video sequence at the lower temporal resolution and/or the lower spatial resolution so as to produce a filtered video sequence at the maximum spatial and temporal resolutions; determining a reference sequence that is, at most, equal to the content of said video sequence at the maximum spatial and temporal resolutions; and calculating a metric of perceived quality of said video sequence at the lower temporal resolution and/or the lower spatial resolution.

6 Claims, 5 Drawing Sheets

OTHER PUBLICATIONS

G. Zhai et al.: "Cross-Dimensional Perceptual Quality Assessment for Low Bit-Rate Videos," IEEE Transactions on Multimedia, IEEE Service Center, Piscataway, NJ, US, vol. 10, No. 7, Nov. 1, 2008, pp. 1316-1324.

E. Ong et al.: "Quality Evaluation of MPEG-4 and H.26L Coded Video for Mobile Multimedia Communication," Signal Processing and Its Applications, 2003. Proceedings, Seventh International Symposium on Jul. 1-4, 2003, Piscataway, NJ, USA, IEEE, vol. 1, Jul. 1, 2003, pp. 473-476.

E. Ong et al.: "Perceptual quality and objective quality measurements of compressed videos," Journal of Visual Communication and Image Representation, Academic Press, Inc., US, vol. 17, No. 4, Aug. 1, 2006, pp. 717-737.

* cited by examiner

METHOD OF ESTIMATING VIDEO QUALITY AT ANY RESOLUTION

CROSS-REFERENCE TO RELATED APPLICATIONS

This application is a National Stage of International patent application PCT/EP2010/069386, filed on Dec. 10, 2010, which claims priority to foreign French patent application No. FR 09 06006, filed on Dec. 11, 2009, the disclosures of each of which are incorporated by reference in their entireties.

FIELD OF THE DISCLOSED SUBJECT MATTER

The present invention relates to a method of estimating the quality of a video sequence at different spatial or temporal resolutions, this video sequence being transmitted via a constrained environment. The invention applies notably to a video sequence compressed by a source coder having the faculty to produce a plurality of overlapping subsets, each corresponding to a temporal or spatial resolution potentially different from the resolution of the initial sequence. This is referred to as scalability. The invention also applies to the domain of video signal broadcasting via imperfect transmission channels, i.e. subjected to transmission losses or errors and/or a variable and constrained transmission rate.

BACKGROUND

The evaluation of the quality perceived by the user of a compressed video sequence is of particular interest when the source code offers the possibility of having a plurality of different spatial and temporal resolutions, also referred to as scalability layers, within the same compressed flow. In a context of broadcasting of such a video flow via an imperfect environment, it is important to be able to evaluate the quality of each resolution independently from the others and thus to measure the impact of interferences caused by the transmission on each scalability layer. Interest also lies in the comparison of the perceived quality between video sequences which present different resolutions. The estimation of the perceptual quality can thus serve to dynamically adapt the compression parameters in order to adapt the transmitted flow in the best possible way to the constraints of the transmission channel and to the needs of the users. This requirement is even more important in the case of multiple users within a heterogeneous network for which each transmission link presents its own constraints.

Existing solutions for estimating video quality are classified into two main groups. A first type of solution is based on a subjective quality evaluation using a panel of users. Subjective solutions have numerous disadvantages, their implementation is complex and costly and above all they do not respond to the specific problem of a dynamic adaptation of a compressed video flow according to the estimation of the perceived quality, which must therefore be generated in an automatic manner.

A second type of solution relates to objective methods. These solutions are most often based on an error measurement between the pixels of the initial sequence and the recomposed pixels, such as the distortion measurement known as PSNR ("Peak Signal to Noise Ratio"). This solution presents insufficient results in terms of correlation with the subjective results. Moreover, solutions based on the measurement of errored pixels are not suitable for comparing two sequences at different resolutions since, from a mathematical point of view, these sequences present a different content, whereas, from a perceptual point of view, the information that they contain is identical. Finally, other solutions are based on a modeling of human vision ("Human Vision System"), which presents better results, but they are not adapted to the constraints linked to temporal/spatial scalability. These techniques are most often adapted to fixed images for a given resolution.

One of the objects of the present invention is to provide a unified solution for the evaluation and comparison of the perceived quality for flows transmitted at different spatial or temporal resolutions which are furthermore subjected to errors or losses. This object is all the more important in the case of a compressed flow offering scalability and for which the choice of the transmission and/or decoding of a particular resolution from a plurality of available resolutions arises. Another object of the present invention therefore consists in proposing a solution allowing the best resolution in terms of visual perception to be chosen from a plurality of possible resolutions. Finally, the present invention also aims to enable, in the case of a compressed flow offering scalability, automatic determination of the best choice of decoding from the available resolutions layers.

For this purpose, the invention proposes a method of estimating and comparing perceived quality applicable to a compressed video flow composed of a plurality of overlapping subsets, each representing a different resolution layer. Moreover, the invention uses an objective metric, based not on the measurement of errored pixels, but taking account of the visual structure of the content of the video sequence.

SUMMARY

The subject-matter of the invention is notably a method of estimating the perceived quality of a video sequence represented, on the one hand, at a maximum spatial resolution and a maximum temporal resolution and, on the other hand, at a lower spatial and/or temporal resolution, said method being characterized in that it comprises at least a first step of filtering said video sequence represented at the lower temporal resolution and/or the lower spatial resolution in order to produce a filtered video sequence represented at the maximum spatial and temporal resolutions, a second step of determining a reference sequence that is equal at most to the content of said video sequence represented at the maximum spatial and temporal resolutions, and a third step of calculating a metric of perceived quality of said video sequence represented at the lower temporal resolution and/or the lower spatial resolution, comprising the following sub-steps:

calculating the luminance of the reference sequence and of the filtered sequence, subtracting from the reference sequence and from the filtered sequence the respective results of the calculation of their luminance, determining, on the basis of the results of said subtractions, a measurement of the contrast of the reference sequence and of the filtered sequence, normalizing the result of said subtractions by said measurement of the contrast of the reference sequence and of the filtered sequence respectively in order to produce a measurement of the structure of the reference sequence and of the filtered sequence respectively, determining a comparison function $l(x,y)$ comparing the luminances of the reference sequence and of the filtered sequence, determining a comparison function $c(x,y)$ comparing the contrasts of the reference sequence and of the filtered sequence, determining a comparison function s(x,y) comparing the structures of the reference sequence and of the filtered sequence, carrying out a combination of said comparison functions in order to produce said metric of perceived quality $M(x,y)=l(x,y)^\alpha \cdot c(x,y)^\beta \cdot s(x,y)^\gamma$, where $\alpha, \beta, \gamma$ are strictly positive integers.

According to an alternative embodiment of the invention, said filtering step is implemented through spatial and/or temporal interpolation.

According to an alternative embodiment of the invention, said method includes an additional step of comparing the metrics of perceived quality of said video sequence represented at said maximum spatial and temporal resolution and at a plurality of lower spatial and/or temporal resolutions, and selecting the resolution presenting the best metric.

According to an alternative embodiment of the invention, said reference sequence is composed of a subset of the content of said video sequence represented at the maximum spatial and temporal resolutions, and the steps of calculating the metric of perceived quality are applied to the same subset of said filtered video sequence.

According to an alternative embodiment of the invention said video sequence is compressed in such a way as to produce a single flow comprising a plurality of overlapping subsets, each corresponding to a pair of different spatial and temporal resolutions.

The subject-matter of the invention is also a use of the above method, characterized in that said compressed video sequence is transmitted via a heterogeneous network and is received by a receiver which carries out the decoding and display of said video sequence at the pair of spatial and temporal resolutions presenting the best metric of perceived quality.

BRIEF DESCRIPTION OF THE DRAWINGS

Other characteristics will become evident from a reading of the following detailed description, given as a non-limiting example with reference to the attached drawings, in which.

DETAILED DESCRIPTION

Figure 1:
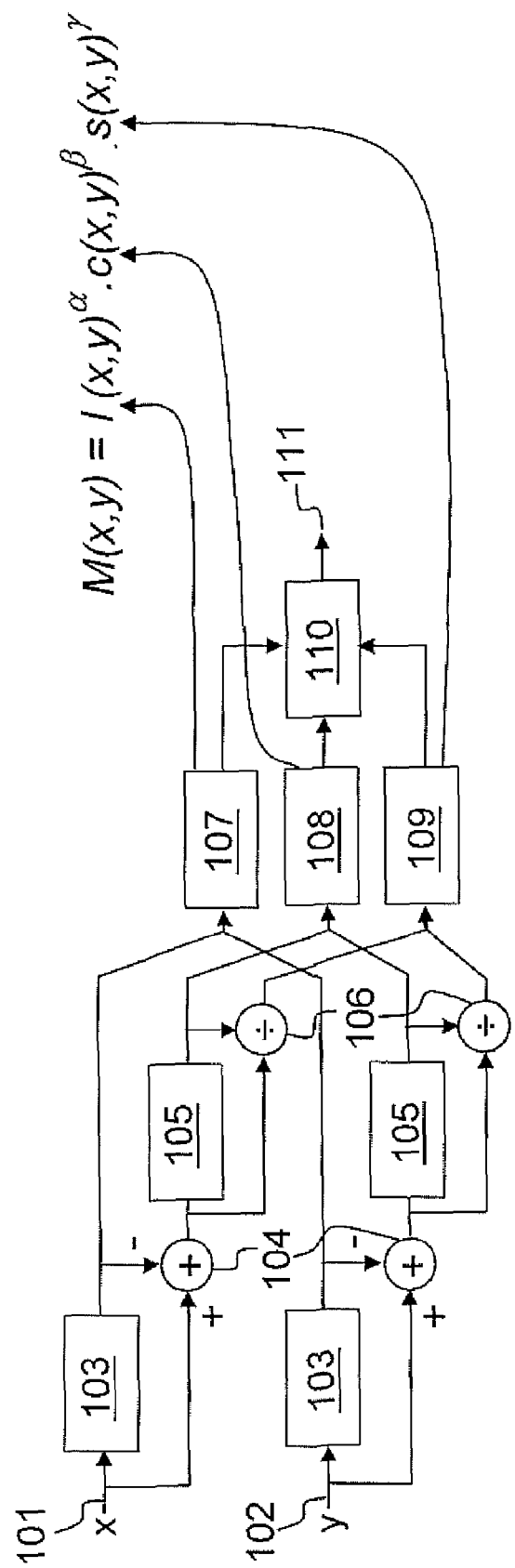
FIG. 1 is a synoptic of the steps of obtaining the quality estimation metric used by the method according to the invention.

FIG. 1 shows schematically the calculation steps carried out in order to estimate the perceived quality between a reference image x 101 and the same image y 102 subjected to distortions due to a lossy compression or to a transmission on a channel subjected to interferences. Said images are extracted from a video sequence. The metric used is based on a calculation evaluating the luminances and contrasts of the images of the reference sequence and of the distorted sequence. An estimation of the structure of the content of the two sequences is also effected in order to take into account the information available in the sequence in a global manner without being limited only to the information contained in an isolated pixel. A measurement of the luminance 103 of the two images is carried out, for example by calculating an estimation of the mean intensity. The result of this measurement is then subtracted 104 from each of the images in order to produce a new image signal on which a measurement of the contrast 105 is carried out, for example through a calculation of the standard deviation of said signal. Finally, a normalization 106 is carried out by dividing said signal by the measurement of the contrast 105 carried out. The new signal resulting from this normalization corresponds to an estimation of the structure of each image.

The respective results of the three measurements of luminance 103, contrast 105 and the normalized signal representing the structure of the image are supplied at the input of three comparison modules. A first module 107 carries out the comparison of the luminances of the two image signals 101, 102. A second module 108 carries out the comparison of the contrasts and a third module 109 carries out the comparison of the structures. Finally, a combination system 110 produces, on the basis of the three comparisons, a metric of the perceived quality of the image 102 y compared with the reference image 101 x. This metric is formulated using the following relation:

$$M(x,y) = l(x,y)^\alpha \cdot c(x,y)^\beta \cdot s(x,y)^\gamma \quad (1)$$

where $l(x,y)$ represents the comparison of the luminances of the signals x and y, $c(x,y)$ represents the comparison of the contrasts of the signals x and y, $s(x,y)$ represents the comparison of the structures of the signals x and y, and the coefficients $\alpha, \beta, \gamma$ are strictly positive integers determined through simulation.

The luminance comparison function is, for example, given by the following relation:

$$l(x, y) = \frac{2\mu_x \mu_y + C_1}{\mu_x^2 + \mu_y^2 + C_1} \quad (2)$$

where $\mu_x$ and $\mu_y$ are the mean intensities of the signals x and y, and $C_1$ is a constant determined through simulation.

The contrast comparison function is, for example, given by the following relation:

$$c(x, y) = \frac{2\sigma_x \sigma_y + C_2}{\sigma_x^2 + \sigma_y^2 + C_2} \quad (3)$$

where $\sigma_x$ and $\sigma_y$ are the standard deviations of the intensities of the signals x and y, and $C_2$ is a constant determined through simulation.

Finally, the structure comparison function is, for example, given by the following relation:

$$s(x, y) = \frac{\sigma_{xy} + C_3}{\sigma_x \sigma_y + C_3} \quad (4)$$

where $\sigma_{xy}$ is the coefficient of correlation between the intensities of the signals x and y, and $C_3$ is a constant determined through simulation.

Figure 2:
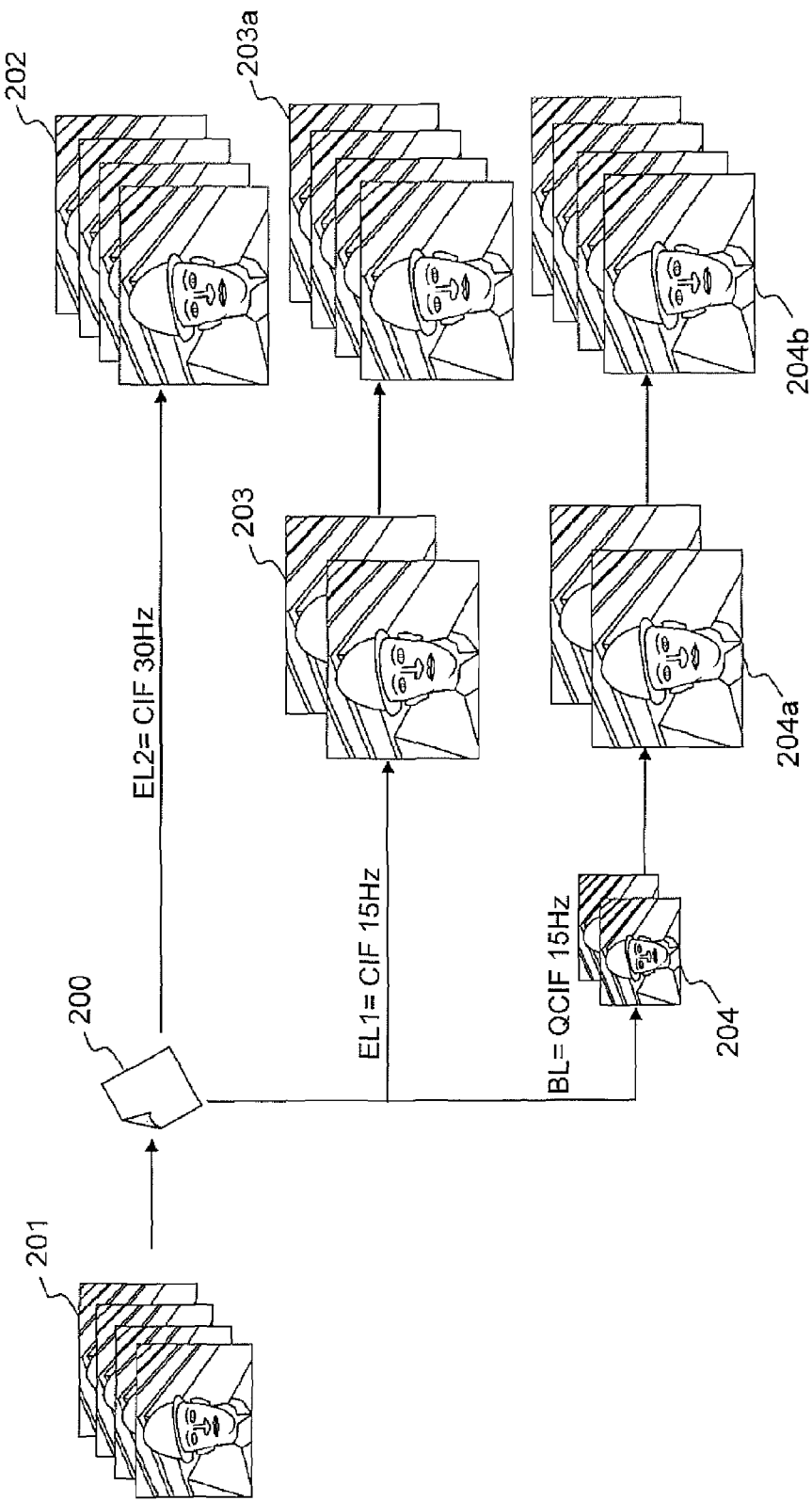
FIG. 2 is an illustration of the temporal and spatial scalability principle of a compressed video flow.

FIG. 2 shows a diagram of an example of temporal and spatial scalability of a compressed video flow. A video coder 200, for example a coder compliant with the video compression standard H.264/SVC as defined in the reference "ITU-T Rec. H.264|ISO/IEC 14496-10 annex G 2009", may, instead of supplying a single compressed flow corresponding to the original video sequence at a given spatial and temporal resolution, on the contrary produce a flow that contains a plurality of overlapping and hierarchized subsets. The first subset contains the information relating to the pair of weakest spatial and temporal resolutions, this first subset being commonly referred to as the base layer. The following subsets contain the additional information which, in combination with the preceding layers, enables the production of a sequence at a higher level of spatial or temporal resolution. This then involves an additional resolution layer, known as the enhancement layer, at level i, i being a strictly positive integer. FIG. 2 shows an example of the scalability principle. The base layer 204 corresponds to the original video sequence at the QCIF ("Quarter Common Intermediate Format") standard spatial resolution and at the temporal resolution of 15 Hertz. A first, level 1 enhancement layer 203 is obtained by adding the necessary information enabling the transition from the QCIF spatial resolution to the CIF spatial resolution. Finally, a second, level 2 enhancement layer 202 is obtained by adding the necessary information to the two preceding layers enabling the transition from the 15 Hz temporal resolution to the 30 Hz temporal resolution.

In a general manner, the resolution layers are hierarchized in such a way that an increase, either in the temporal resolution or in the spatial resolution or in both at the same time is carried out between a level i layer and a level i+1 layer. It will be noted that it is also possible to perform the hierarchization on the basis of spatial and temporal quality.

A compressed flow of this type presenting scalability can therefore be decoded at a plurality of different resolutions. Each subset being independent from the others, it can also be transmitted on different propagation channels and can therefore be subjected to losses and/or errors having different statistics. The problem then arises of estimating the perceived quality of a video sequence at a minimum resolution, for example the QCIF 15 Hz resolution, and above all of comparing this quality in relation to that perceived for the same video sequence at the maximum resolution, for example the CIF 30 Hz resolution. The conventional metrics carrying out a pixel-by-pixel comparison cannot function for video sequences which do not comprise the same number of images per second or the same number of pixels in an image. Similarly, the metric presented with reference to FIG. 1 uses as input signals two fixed images presenting the same spatial resolution.

The method according to the invention therefore consists in adapting the metric previously introduced in order to allow a comparison of two video sequences at different resolutions.

A preliminary filtering step is introduced for this purpose. In the example shown in FIG. 2, the reference video sequence is the sequence that presents the best spatio-temporal resolution, this being the sequence 201 in the CIF 30 Hz format which is compressed by the coder 200. This sequence 201 is then referred to as the reference sequence. This is the original video sequence before compression.

In an alternative embodiment of the invention, the reference sequence may consist in one or more zones of one or more images of the sequence. An alternative embodiment of this type is of interest when the reference sequence is not known and must be, for example, transmitted via a channel presenting a limited transmission rate. With a view to optimizing the transmission rate consumed, a reduced version of the reference sequence can be used to carry out the quality measurements.

In order to measure the perceived quality of the sequence 204 in the QCIF 15 Hz format compared with the reference sequence, it is appropriate to transform this sequence 204 to return it to a spatio-temporal resolution comparable to that of the reference sequence.

Thus, the filtering step according to the invention consists of two sub-steps. A first sub-step of spatial interpolation which enables the production, from the QCIF spatial resolution, of the same sequence at a CIF spatial resolution. The new necessary pixels are generated through interpolation of their nearest neighbors. The new sequence 204a is then obtained.

A second sub-step enables the production, from the 15 Hz temporal resolution, of a sequence at the 30 Hz temporal resolution. Here, this involves inserting an intermediate image between each image of the sequence 204 by estimating the content of this new image on the basis of an average of the preceding or subsequent adjacent images within the sequence. The result of this second step produces a video sequence 204b that can be compared to the reference sequence 201.

The method according to the invention then consists in applying the metric calculation step described with reference to FIG. 1 in order to obtain an objective comparison of the perceived quality between the sequence 204 and the reference sequence. The estimation of the structure of the content of the sequence allows a measurement of the perceived quality to be obtained that is much more correlated with a subjective result than if a measurement based on pixel comparison was used. In fact, the filtering steps described introduce a distortion into the filtered sequence 204b which, although presenting a negligible impact to the human eye, would be detected as being errors by a PSNR measurement. Thus, the use of a PSNR metric applied to a spatially or temporarily filtered sequence does not allow an estimation of the visual quality perceived by the human eye to be obtained. The present invention aims notably to overcome this disadvantage.

The filtering steps previously described apply in a similar manner to the 15 Hz CIF resolution sequence 203 in order to produce a filtered sequence 203a with the same spatial and temporal resolution as the reference sequence.

Figure 3A:
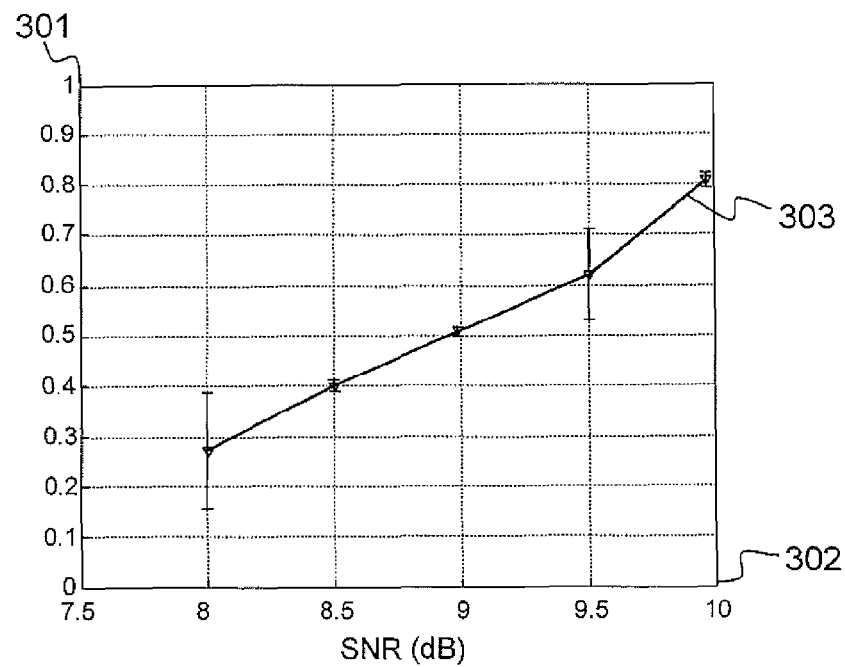
FIGS. 3a and 3b are two examples of result curves showing the estimated quality for a mono-resolution video sequence transmitted on errored or lossy channels.
Figure 3B:
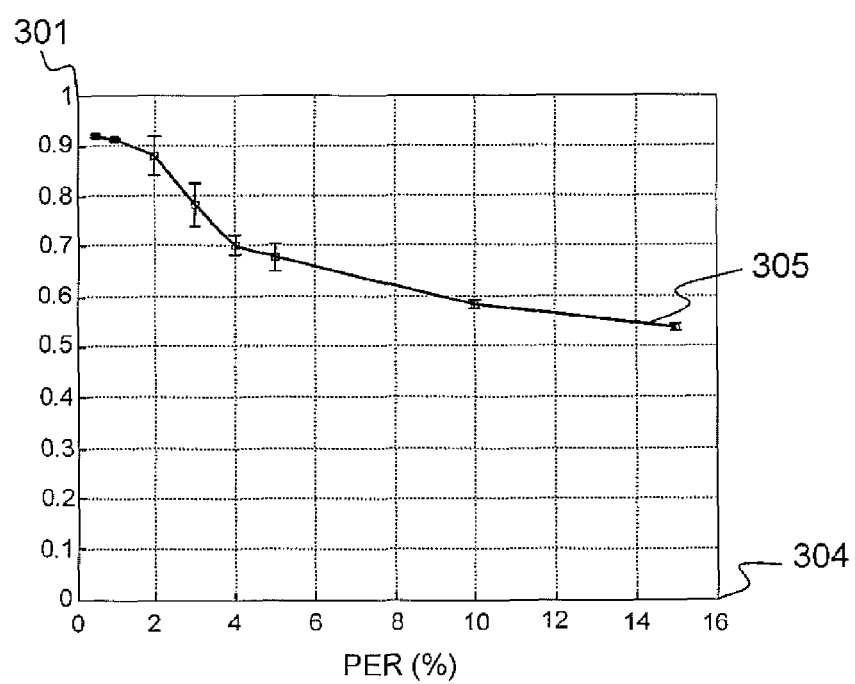

FIGS. 3a and 3b provide indicative values for the video quality estimation according to the invention obtained for the compressed video flows at a single resolution and transmitted via an errored channel (FIG. 3a) or a channel subjected to packet losses (FIG. 3b).

FIG. 3a shows the changes in the quality estimation 303 along the x-axis 302 showing different signal-to-noise ratio values and along the y-axis 301 showing the values of the quality estimation metric between 0 and 1. The estimation of perceived quality tends towards a threshold value when the signal-to-noise ratio is low (strong interferences) and inversely tends towards 1 when the signal-to-noise ratio is high.

FIG. 3b shows the quality estimation 305 along the x-axis 304 showing different packet error rate values. The quality estimation 305 decreases when the packet error rate increases. A packet corresponds here to a logical unit of the compressed video flow.

Figure 4A:
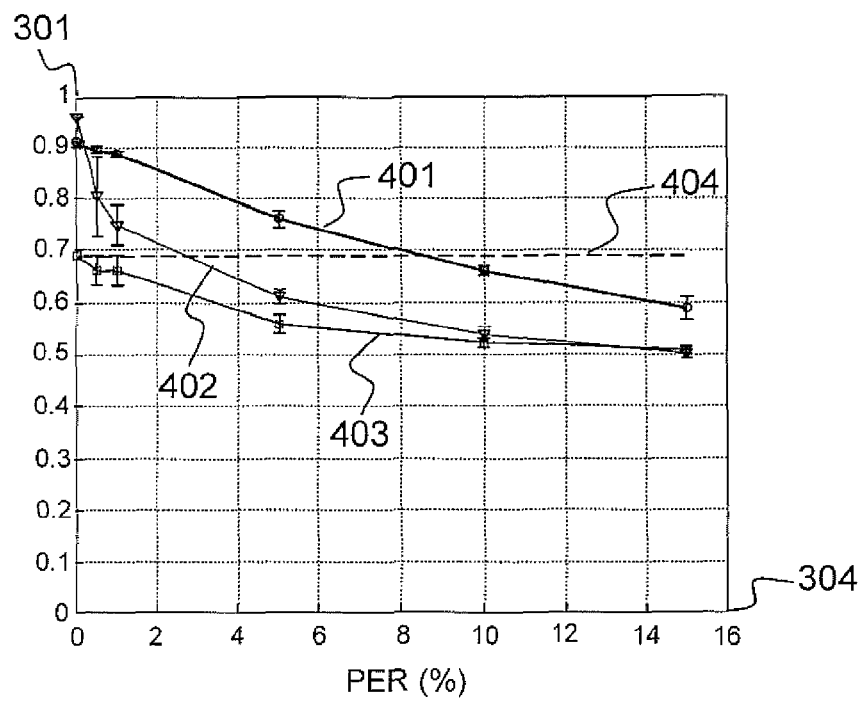
FIGS. 4a and 4b are two examples of curves showing the estimated quality for a sequence comprising three resolution layers and transmitted via a lossy channel.
Figure 4B:
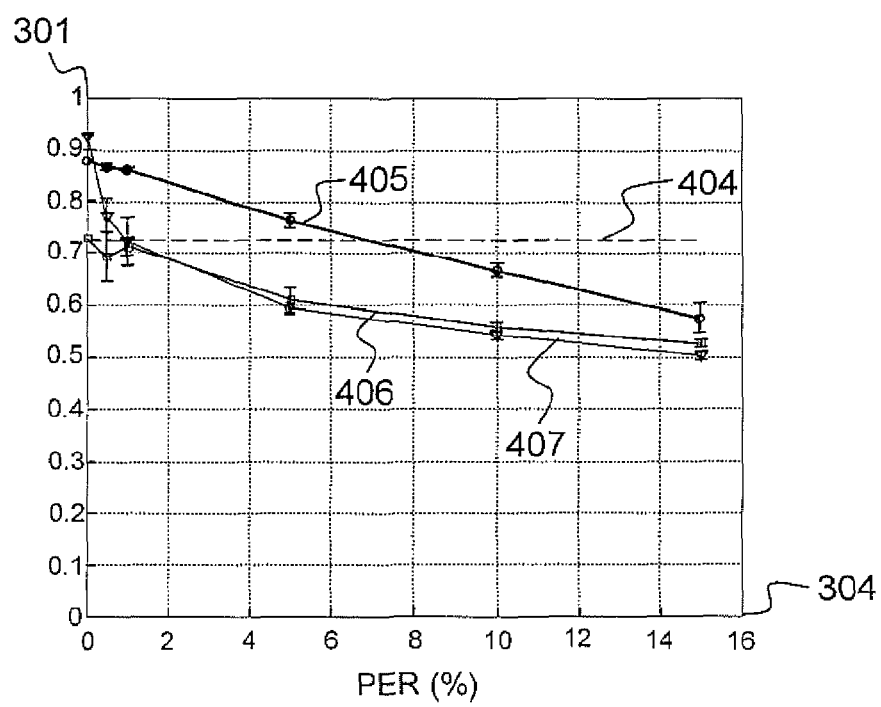

FIGS. 4a and 4b show an example of perceived quality estimation values for a video sequence at different spatial or temporal resolutions and as a function of the packet error rate 304. The following three resolutions are evaluated, by way of example. The curves 403, 406 show the perceived quality for a given sequence at a QCIF spatial resolution and a 15 Hz temporal resolution. The curves 402, 407 are obtained for a sequence at a CIF spatial resolution and a 15 Hz temporal resolution. Finally, the curves 401, 405 show the perceived quality for the higher-resolution sequence, i.e. a CIF spatial resolution and a 30 Hertz temporal resolution.

By way of indication, the quality curve 404 corresponding to the intermediate resolution {CIF 15 Hz} for a sequence that is compressed but not transmitted via a lossy channel is also represented. The curves represented in FIGS. 4a and 4b differ in terms of the choice of the quantification step selected to compress each resolution. In the case of FIG. 4a, the quantification steps chosen to compress the base layer and the two higher resolution layers respectively are taken as equal to {36,26,32}. In the case of FIG. 4b, these same quantification steps are taken as equal to {32,32,32}. The video sequences are compressed using a video coder compatible with the H.264/SVC standard, on the understanding that these results are given by way of illustration and that the method according to the invention is in no way limited to one video compression standard in particular, but applies to any compression method allowing a flow comprising a plurality of spatial and/or temporal scalability layers to be generated.

It is relevant to note that, according to the choice of compression parameters (here the quantification step), the estimation of perceived quality for the intermediate resolution layer 402, 407 may be higher or lower than that of the base layer 403, 406 for a given packet loss rate. Consequently, the highest resolution does not always result in the best perceived quality, which justifies the need for a method for evaluating and comparing the quality of a video sequence at different resolutions.

Figure 5:
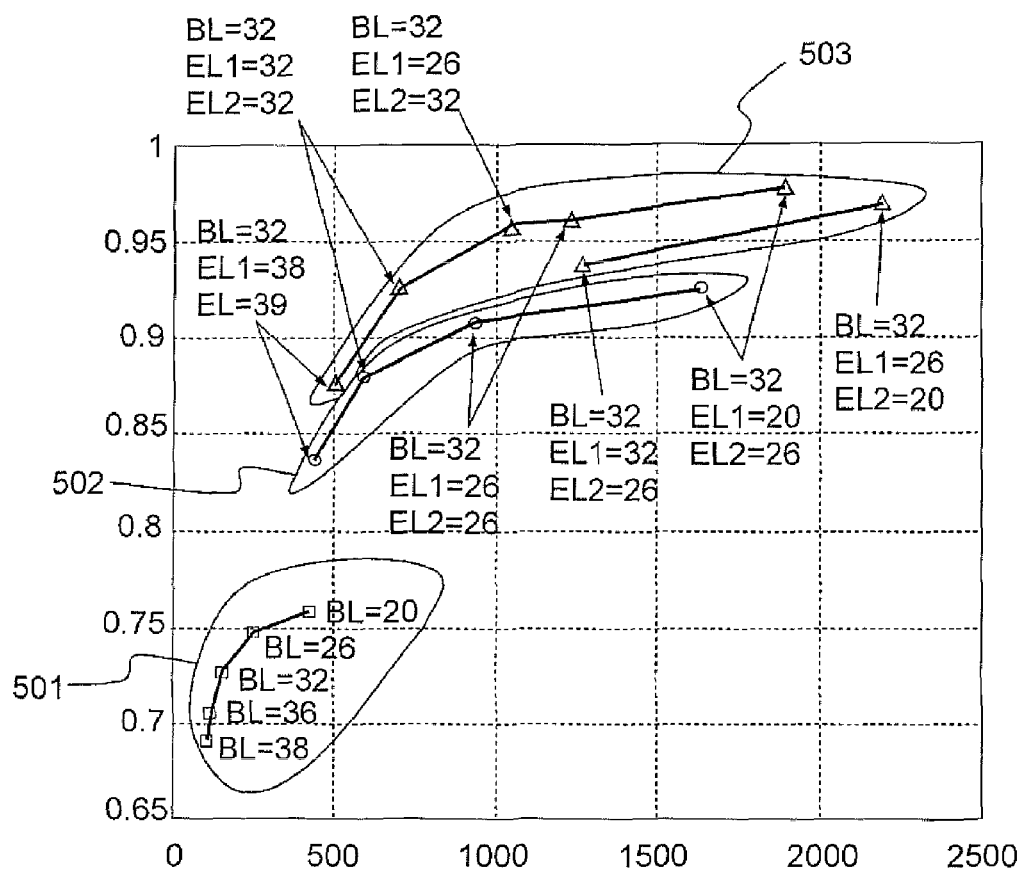
FIG. 5 is a diagram showing the estimation of perceived quality using the method according to the invention as a function of the useful transmission rate of the video sequence.

FIG. 5 shows an application of the method according to the invention allowing validation of the choice of the quantification steps used during the step of compressing a flow at a plurality of resolution levels.

The graphic in FIG. 5 shows the quality ratings estimated on the basis of the method according to the invention for the three resolutions previously introduced with reference to FIG. 4. The estimated qualities are shown as a function of the useful transmission rate of the compressed video flow and each point corresponds to a given quantification step for a resolution layer. The curve 501 corresponds to the base layer (QCIF, 15 Hz), denoted BL, compressed with different quantification steps then filtered by the method according to the invention to obtain a sequence at the higher resolution (CIF, 30 Hz). The curve 502 corresponds to the intermediate layer (CIF, 15 Hz), denoted EL1, obtained on the basis of the base layer compressed with a quantification step equal to 32 to which the additional information to increase the spatial resolution has been added, this information being compressed with different quantification steps which correspond to the different points of the curve 502. The resolution (CIF, 15 Hz) is also filtered by the method according to the invention to obtain a sequence at the higher resolution. Finally, all of the points 503 correspond to the higher resolution (CIF, 30 Hz).

The graphic in FIG. 5 notably enables verification that the triplet of quantification steps assigned to the three resolution layers {32,20,26} gives a better estimation of the perceived quality than the triplet {32,26,20}. This observation enables validation of the relative compression choices at each resolution layer.

Moreover, it can also be noted that the estimation of perceived quality for the intermediate resolution layer 502 (CIF, 15 Hz) with the quantification steps (32, 32) is better than that of the maximum resolution layer 503 with the quantification steps {32,38,38} for very closely adjacent transmission rates. In this case, the method according to the invention enables determination that a lower resolution may ultimately allow a higher perceived quality to be obtained than that obtained with the highest resolution, and at an identical useful transmission rate.

A possible application of the method according to the invention concerns the evaluation of the quality metrics relating to each resolution layer for the purpose of validating the choices of compression of a flow presenting temporal or spatial scalability. In particular, the quantification step parameter can be determined according to these metrics. A possible decision criterion consists in fixing a minimum range of values for the estimation of the quality of each resolution layer. For example, a minimum range equal to 0.1 must be respected between each spatial resolution layer. Similarly, a minimum range equal to 0.05 can be forced between each temporal resolution layer.

A different possible application concerns the broadcasting of compressed video flows via a heterogeneous network and to a plurality of users. When said flow is received by a suitable receiver, an evaluation of the quality metric can be carried out for each resolution layer available within the flow and only the best resolution in terms of perceived quality is then decoded and displayed.

A heterogeneous network usually comprises intermediate nodes which can implement a function of transcoding of the multimedia flows passing through them. The transcoding consists in adapting the flow to the constraints of the transmission medium/media, notably in terms of available transmission rate, but also in terms of necessary protection of the flow against the interferences linked to the transmission channel. A flow with spatial/temporal scalability offers the advantage of overlapping a plurality of hierarchized subsets according to the required resolution level. A flow of this type therefore has a useful transmission rate which is adaptable to the constraints of the transmission channel. The evaluation of the quality metrics of each resolution layer, according to the invention, enables a priori evaluation of the degradations of the sequence in the presence of losses or errors for each resolution, and thus enables the possible suppression of the highest resolution level(s) in order to limit the useful transmission rate with regard to the perceived quality which, as shown in FIGS. 4a and 4b, does not necessarily increase with the resolution level.

The invention claimed is:

1. A method of estimating the perceived quality of a video sequence represented, on the one hand, at a maximum spatial resolution and a maximum temporal resolution and, on the other hand, at a lower spatial and/or temporal resolution, said method comprising:

filtering said video sequence represented at the lower temporal resolution and/or the lower spatial resolution in order to produce a filtered video sequence (203a, 204b) represented at the maximum spatial and temporal resolutions;

determining a reference sequence that is equal at most to the content of said video sequence represented at the maximum spatial and temporal resolutions; and calculating a metric of perceived quality of said sequence video (203, 204) represented at the lower temporal resolution and/or the lower spatial resolution, the calculating comprising:

calculating the luminance of the reference sequence and of the filtered sequence, subtracting from the reference sequence and from the filtered sequence the respective results of the calculation of their luminance, determining, on the basis of the results of said subtractions, a measurement of the contrast of the reference sequence and of the filtered sequence, normalizing the result of said subtractions by said measurement of the contrast of the reference sequence and of the filtered sequence respectively in order to produce a measurement of the structure of the reference sequence and of the filtered sequence respectively, determining a comparison function l(x,y) comparing the luminances of the reference sequence and of the filtered sequence, determining a comparison function c(x,y) comparing the contrasts of the reference sequence and of the filtered sequence, determining a comparison function s(x,y) comparing the structures of the reference sequence and of the filtered sequence, and carrying out a combination of said comparison functions in order to produce said metric of perceived quality $M(X,y)=l(X,y)^{\alpha} \cdot c(x,y)^{\beta} \cdot s(x,y)^{\gamma}$, where $\alpha$, $\beta$, $\gamma$ are strictly positive integers.

2. The method as claimed in claim 1, wherein said filtering is implemented through spatial and/or temporal interpolation.

3. The method as claimed in claim 1, further comprising:

comparing the metrics of perceived quality of said video sequence represented at said maximum spatial and temporal resolution and at a plurality of lower spatial and/or temporal resolutions, and selecting the resolution presenting the best metric.

4. The method as claimed in claim 1, wherein said reference sequence is composed of a subset of the content of said video sequence (201) represented at the maximum spatial and temporal resolutions, and the calculating the metric of perceived quality is applied to the same subset of said filtered video sequence.

5. The method as claimed in claim 1, wherein said video sequence is compressed in such a way as to produce a single flow comprising a plurality of overlapping subsets, each corresponding to a pair of different spatial and temporal resolutions.

6. The use of the method as claimed in claim 5, wherein said compressed video sequence is transmitted via a heterogeneous network and is received by a receiver which carries out the decoding and display of said video sequence at the pair of spatial and temporal resolutions presenting the best metric of perceived quality.

* * * * *